US010982332B2

(12) United States Patent
Rack

(10) Patent No.: US 10,982,332 B2
(45) Date of Patent: Apr. 20, 2021

(54) METHOD OF MANUFACTURING A STRUCTURAL ARRANGEMENT WITH A FIBER REINFORCED POLYMER COMPONENT AND A COLD GAS SPRAYED ELECTRICALLY CONDUCTIVE LAYER

(71) Applicant: AIRBUS HELICOPTERS DEUTSCHLAND GMBH, Donauworth (DE)

(72) Inventor: Andreas Rack, Burghausen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 307 days.

(21) Appl. No.: 15/975,874

(22) Filed: May 10, 2018

(65) Prior Publication Data
US 2018/0327911 A1 Nov. 15, 2018

(30) Foreign Application Priority Data

May 11, 2017 (EP) ..................................... 17400027

(51) Int. Cl.
*B29C 70/88* (2006.01)
*B32B 27/08* (2006.01)
(Continued)

(52) U.S. Cl.
CPC ............ *C23C 24/04* (2013.01); *B29C 70/882* (2013.01); *B32B 27/08* (2013.01); *B32B 27/286* (2013.01);
(Continued)

(58) Field of Classification Search
CPC ....... B29C 70/30; B29C 70/34; B29C 70/342; B29C 70/345; B29C 70/40; B29C 70/42; B29C 70/44; B29C 70/46; B29C 70/68; B29C 70/682; B29C 70/78; B29C 70/882; B29L 2031/3076; B29L 2031/3082; B29L 2031/3085; B29L 2031/3088; B32B 15/08; B32B 15/20; B32B 27/08; B32B 27/286;
(Continued)

(56) References Cited

U.S. PATENT DOCUMENTS 9,676,961 B2* 6/2017 Sang .................... C09D 163/04
9,908,298 B2* 3/2018 Restuccia ............... B29C 70/88
(Continued)

FOREIGN PATENT DOCUMENTS

DE 3716004 A1 11/1988
WO 2016064460 A2 4/2016

OTHER PUBLICATIONS

European Search Report for EP 17400027, Completed by the European Patent Office, dated Nov. 21, 2017, All together 5 Pages.

*Primary Examiner* — Michael A Tolin
(74) *Attorney, Agent, or Firm* — Brooks Kushman P.C.

(57) ABSTRACT

A method of manufacturing a structural arrangement on the basis of a fiber reinforced polymer component, comprising at least the steps of: providing a fiber reinforced polymer component; fixing a polyether sulfone foil on the fiber reinforced polymer component, at least in a region where an electrically conductive layer is to be formed; and performing a cold gas spraying process for spraying electrically conductive particles onto the polyether sulfone foil in order to create the electrically conductive layer.

19 Claims, 3 Drawing Sheets

(51) Int. Cl.
  *B32B 27/28* (2006.01)
  *B32B 27/38* (2006.01)
  *B32B 37/24* (2006.01)
  *B32B 38/16* (2006.01)
  *C23C 24/04* (2006.01)
  *C23C 28/00* (2006.01)
  *B29L 31/30* (2006.01)
  *B64C 1/00* (2006.01)

(52) U.S. Cl.
  CPC ............ *B32B 27/38* (2013.01); *B32B 38/162* (2013.01); *C23C 28/00* (2013.01); *B29L 2031/3076* (2013.01); *B32B 2037/243* (2013.01); *B32B 2255/10* (2013.01); *B32B 2255/205* (2013.01); *B32B 2264/105* (2013.01); *B32B 2264/1051* (2020.08); *B32B 2264/1052* (2020.08); *B32B 2264/1055* (2020.08); *B32B 2603/00* (2013.01); *B32B 2605/18* (2013.01); *B64C 2001/0072* (2013.01)

(58) Field of Classification Search
  CPC . B32B 27/38; B32B 2037/243; B32B 38/162; B32B 2255/10; B32B 2255/205; B32B 2264/105; B32B 2264/1051; B32B 2264/1052; B32B 2264/1055; B32B 2307/202; B32B 2603/00; B32B 2605/18; B64C 2001/0072; B64C 27/00; B64C 27/04; C23C 24/04; C23C 28/00
  See application file for complete search history.

(56) References Cited

U.S. PATENT DOCUMENTS

| | | | |
|---|---|---|---|
| 10,060,019 B2* | 8/2018 | Ranade | .................. C23C 14/35 |
| 2009/0029180 A1 | 1/2009 | Oguri et al. | |
| 2009/0068453 A1 | 3/2009 | Chung | |
| 2016/0160863 A1 | 6/2016 | Roach et al. | |
| 2017/0043552 A1 | 2/2017 | Lenzi | |

* cited by examiner

METHOD OF MANUFACTURING A STRUCTURAL ARRANGEMENT WITH A FIBER REINFORCED POLYMER COMPONENT AND A COLD GAS SPRAYED ELECTRICALLY CONDUCTIVE LAYER

CROSS-REFERENCE TO RELATED APPLICATIONS

This application claims priority to European patent application No. EP 17400027.3 filed on May 11, 2017, the disclosure of which is incorporated in its entirety by reference herein.

BACKGROUND OF THE INVENTION

(1) Field of the Invention

The invention is related to a method of manufacturing a structural arrangement on the basis of a fiber reinforced polymer component that is to be provided with a cold gas sprayed electrically conductive layer. The invention is further related to a respective structural arrangement with a fiber reinforced polymer component that comprises a cold gas sprayed electrically conductive layer, as well as to a rotary wing aircraft having such a structural arrangement.

2) Description of Related Art

Currently, an ever-increasing number of rotary wing aircrafts is authorized to fly under Instrument Flight Rules (IFR) in all type of weather conditions, so that operating environments of such rotary wing aircrafts and, consequently, an underlying design philosophy have significantly changed. This particularly applies to respective structural arrangements, especially aircraft airframes resp. fuselages, of the rotary wing aircrafts, which are more and more implemented by means of fiber reinforced polymer components, e. g. fiber reinforced polymer panels.

However, such fiber reinforced polymer components have an electrical behaviour, in particular with respect to lightning strikes, that significantly differs from a respective electrical behaviour of e. g. aluminium structural arrangements, which were formerly mainly used in implementing aircraft structural arrangements. As a result of this different electrical behaviour, a respective possibility of a lightning strike of a given rotary wing aircraft has increased.

As it is well-known, such a lightning strike may have serious consequences. Such consequences are roughly divided into two different categories: lightning direct effects (LDEs) and lightning indirect effects (LIEs).

More specifically, LDEs refer to damages that include burning, eroding, blasting and structural deformation produced by high electrical currents resulting from a lightning flash that passes through a structural arrangement of a given rotary wing aircraft. LIEs in turn refer to perturbations, failures, damages of equipment, including ignitions, which result from a respective electrical transient that is generated by a lightning flash and that leads to an electromagnetic coupling with electrical and/or electronical equipment of a given rotary wing aircraft.

As a consequence, rotary wing aircrafts that are mainly implemented by means of fiber reinforced polymer components, e. g. fiber reinforced polymer panels, are comparatively more prone to lightning strikes and must, therefore, be provided with a suitable protection against LDEs and LIEs. However, as such fiber reinforced polymer components, e. g. carbon fiber reinforced polymer components, have a higher electrical resistance than comparable aluminium components, a proper metallization for electrical bonding and grounding is necessary.

In order to reduce an underlying number of cables and wiring required to create such a proper metallization, the latter can be formed by means of suitable metallic circuit paths that are sprayed on respective fiber reinforced polymer components. This is particularly advantageous, as e. g. an outer skin of a rotary wing aircraft that is manufactured using the respective fiber reinforced polymer components must not only be electrically conductive, but preferably be as lightweight as possible and should preferentially be produced with a cost efficient and reliable process.

However, in order to allow for formation of the suitable metallic circuit paths on the respective fiber reinforced polymer components by means of spraying, in particular by means of cold gas spraying, the surface of the respective fiber reinforced polymer components must be able to provide a good adherence for a respective metal spray. Nevertheless, metal sprays generally do not adhere in good quality on fiber reinforced polymer components, and more particularly on carbon fiber reinforced polymer components. Instead, the metal sprays rather damage respective fibers or resin material of the fiber reinforced polymer components, respectively the carbon fiber reinforced polymer components. Thus, a suitable material that allows for a secure and reliable metallization of fiber reinforced polymer components, respectively carbon fiber reinforced polymer components, is required.

The document WO2016064460 describes a method of manufacturing a fiber reinforced polymer component with a metallization. The method involves first forming an intermediate substrate. The latter can be formed from fibers and an uncured thermoset polymer composition followed by partial cure, or from fibers and an uncured thermoset polymer composition followed by cure of the thermoset polymer composition and deposition of a thermoplastic on the surface of the substrate, or from fibers and an uncured thermoset polymer composition followed by cure and exposure of the substrate to organic solvent, a plasticizer, moisture, and/or heat. The intermediate substrate is formed from fibers and an uncured thermoset polymer composition. Furthermore, a thermoplastic surface layer can be deposited on the surface of the intermediate substrate. The thermoplastic surface layer can be made of a polyaryletherketone (PAEK), such as polyetheretherketone (PEEK), polyethylene, and polyetherimide. The intermediate substrate prepared according to any of the above techniques is then subjected to cold gas spray deposition to deposit a metal layer onto the intermediate substrate. In the case where the substrate was formed by partially curing a thermoset polymer composition, the metal-coated partially-cured thermoset polymer substrate is then fully cured.

Other documents were considered: US2016160863, US2017043552, US2009029180, US2009068453 and DE3716004.

BRIEF SUMMARY OF THE INVENTION

It is an object of the present invention to provide a new method of manufacturing a structural arrangement on the basis of a fiber reinforced polymer component that is to be provided with a cold gas sprayed electrically conductive layer, wherein a reliable and high quality adherence of the cold gas sprayed electrically conductive layer on the fiber reinforced polymer component can be achieved. It is a further object of the present invention to provide a new structural arrangement having a fiber reinforced polymer component that comprises a cold gas sprayed electrically conductive layer with a reliable and high quality adherence of the cold gas sprayed electrically conductive layer on the fiber reinforced polymer component. It is, moreover, an object of the present invention to provide a new rotary wing aircraft having such a structural arrangement.

This object is solved by a method of manufacturing a structural arrangement on the basis of a fiber reinforced polymer component, the method comprising the features of claim 1.

More specifically, according to the present invention the method of manufacturing a structural arrangement on the basis of a fiber reinforced polymer component comprises at least the steps of: providing a fiber reinforced polymer component; fixing a polyether sulfone foil on the fiber reinforced polymer component, at least in a region where an electrically conductive layer is to be formed; and performing a cold gas spraying process for spraying electrically conductive particles onto the polyether sulfone foil in order to create the electrically conductive layer.

Advantageously, the electrically conductive layer can be used as a suitable protection of the structural arrangement and, more particularly, of the fiber reinforced polymer component against LDEs and LIEs. However, the present invention is not limited to such LDE and LIE protection. Instead, the electrically conductive layer can likewise be used for other purposes, such as e. g. electrical power supply and/or as data line.

According to one aspect, the polyether sulfone foil forms an intermediate layer on the fiber reinforced polymer component at a side of the fiber reinforced polymer component, where a required metallization is to be formed. Preferably, the polyether sulfone foil is provided with dimensions that correspond at least approximately to corresponding dimensions of the required metallization that is to be created on the polyether sulfone foil. By way of example, the polyether sulfone foil is provided in the form of strips or patches or a large-area surface element. Preferably, the polyether sulfone foil is comparatively thin, e. g in a range of 50 µm to 100 µm.

For creation of the required metallization, metallic circuit paths are preferably sprayed by means of a cold gas spraying process onto the polyether sulfone foil in high quality, thus, creating the electrically conductive layer. Accordingly, a fast and reliable metallization of the fiber reinforced polymer component by means of the cold gas spraying process can be achieved.

Advantageously, the cold gas spraying process on the polyether sulfone foil does not lead to any eroding damages at the fiber reinforced polymer component. In particular, the polyether sulfone foil allows spraying a copper layer on the fiber reinforced polymer component without damaging the resin or fibers of the fiber reinforced polymer component by means of the cold gas spraying process. In any case, the cold gas spraying process enables provision of an electrically conductive layer of high quality, especially when compared to other thermal spraying processes.

Moreover, the cold gas sprayed electrically conductive layer enables an integrated lightweight electrical routing on the fiber reinforced polymer component. In addition, an electrical connection of integrated routings of separate fiber reinforced polymer components can easily be realized. Finally, provision of integrated electrical equipment on the fiber reinforced polymer component is enabled.

Preferably, the polyether sulfone foil is bonded onto the fiber reinforced polymer component after curing of the latter. Alternatively, the polyether sulfone foil is arranged on a thermoset fiber reinforced polymer preform in a region of an intended metallization prior to curing the thermoset fiber reinforced polymer preform. In the latter variant, the polyether sulfone foil is preferably laid up into a mold as first resp. bottom layer under, or as last resp. top layer on, an uncured thermoset fiber reinforced polymer preform, or on both outermost sides of the uncured thermoset fiber reinforced polymer preform, depending on which side of the thermoset fiber reinforced polymer preform a required metallization should be located. Then, the thermoset fiber reinforced polymer preform is cured together with the polyether sulfone foil. During the curing, the polyether sulfone foil merges with respective epoxy resin of the thermoset fiber reinforced polymer preform. Subsequently, the thus cured fiber reinforced polymer component with the polyether sulfone foil is preferably cleaned. Then, a layer of metal is preferably sprayed onto the polyether sulfone foil by means of cold gas spraying. This last step can be done manually, but is preferably performed by means of a robot. The metal layer is preferably copper, but also e. g. aluminium, silver, tin or alloys of it can be used. Finally, vacuum evacuation of sprayed metal particles which are not adhering to the polyether sulfone foil is preferentially performed.

According to a preferred embodiment, the step of fixing the polyether sulfone foil on the fiber reinforced polymer component comprises bonding the polyether sulfone foil onto the fiber reinforced polymer component.

According to a further preferred embodiment, the step of providing the fiber reinforced polymer component comprises providing a thermoset fiber reinforced polymer preform, wherein the step of fixing the polyether sulfone foil on the fiber reinforced polymer component comprises curing the polyether sulfone foil together with the thermoset fiber reinforced polymer preform.

According to a further preferred embodiment, curing the polyether sulfone foil together with the thermoset fiber reinforced polymer preform comprises curing the polyether sulfone foil together with the thermoset fiber reinforced polymer preform such that the polyether sulfone foil merges with epoxy resin of the thermoset fiber reinforced polymer preform.

According to a further preferred embodiment, the step of fixing a polyether sulfone foil on the fiber reinforced polymer component comprises fixing at least one strip and/or patch made of polyether sulfone at least in the region where the electrically conductive layer is to be formed.

According to a further preferred embodiment, the step of fixing a polyether sulfone foil on the fiber reinforced polymer component comprises fixing a polyether sulfone foil with a thickness in a range of 50 µm to 100 µm on the fiber reinforced polymer component.

According to a further preferred embodiment, spraying electrically conductive particles onto the polyether sulfone foil comprises spraying copper, aluminium, silver, tin and/or alloy particles onto the polyether sulfone foil.

According to a further preferred embodiment, the method further comprises the step of vacuum cleaning the structural arrangement after or during the step of performing the cold gas spraying process.

The present invention further provides a structural arrangement, comprising: a fiber reinforced polymer component; a cold gas sprayed electrically conductive layer; and a polyether sulfone foil that is arranged on the fiber reinforced polymer component, at least in a region between the fiber reinforced polymer component and the cold gas sprayed electrically conductive layer.

According to a preferred embodiment, the polyether sulfone foil is bonded onto the fiber reinforced polymer component.

According to a further preferred embodiment, the polyether sulfone foil is merged with epoxy resin of the fiber reinforced polymer component.

According to a further preferred embodiment, the polyether sulfone foil exhibits a thickness in a range of 50 μm to 100 μm.

According to a further preferred embodiment, the cold gas sprayed electrically conductive layer comprises copper, aluminium, silver, tin and/or alloy particles.

According to a further preferred embodiment, the polyether sulfone foil comprises at least one strip and/or patch made of polyether sulfone.

The present invention further provides a rotary wing aircraft with a structural arrangement as described above.

BRIEF DESCRIPTION OF THE DRAWINGS

Preferred embodiments of the invention are outlined by way of example in the following description with reference to the attached drawings. In these attached drawings, identical or identically functioning components and elements are labelled with identical reference signs and are, consequently, only described once in the following description.

DETAILED DESCRIPTION OF THE INVENTION

Figure 1:
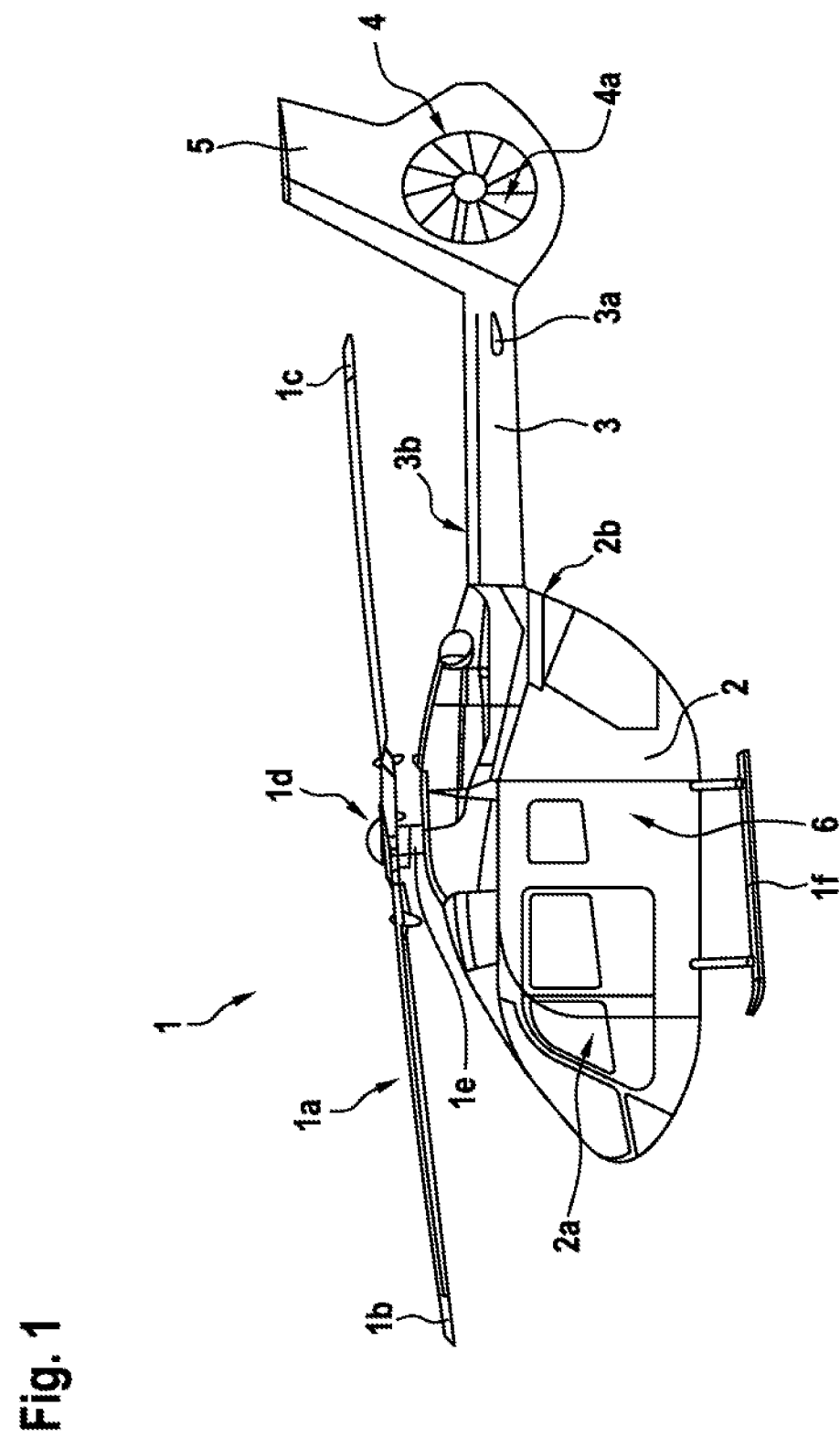
FIG. 1 shows a lateral view of a helicopter with a fuselage that comprises a structural arrangement according to the invention.

FIG. 1 shows an aircraft 1 that is exemplarily illustrated as a rotary wing aircraft and, more particularly, as a helicopter. Thus, for purposes of simplicity and clarity, the aircraft 1 is hereinafter referred to as the "helicopter" 1.

Illustratively, the helicopter 1 comprises a fuselage 2 that is connected to a landing gear 1f and defines a cabin 2a and a rear fuselage 2b. The rear fuselage 2b is connected to a tail boom 3.

Figure 2:
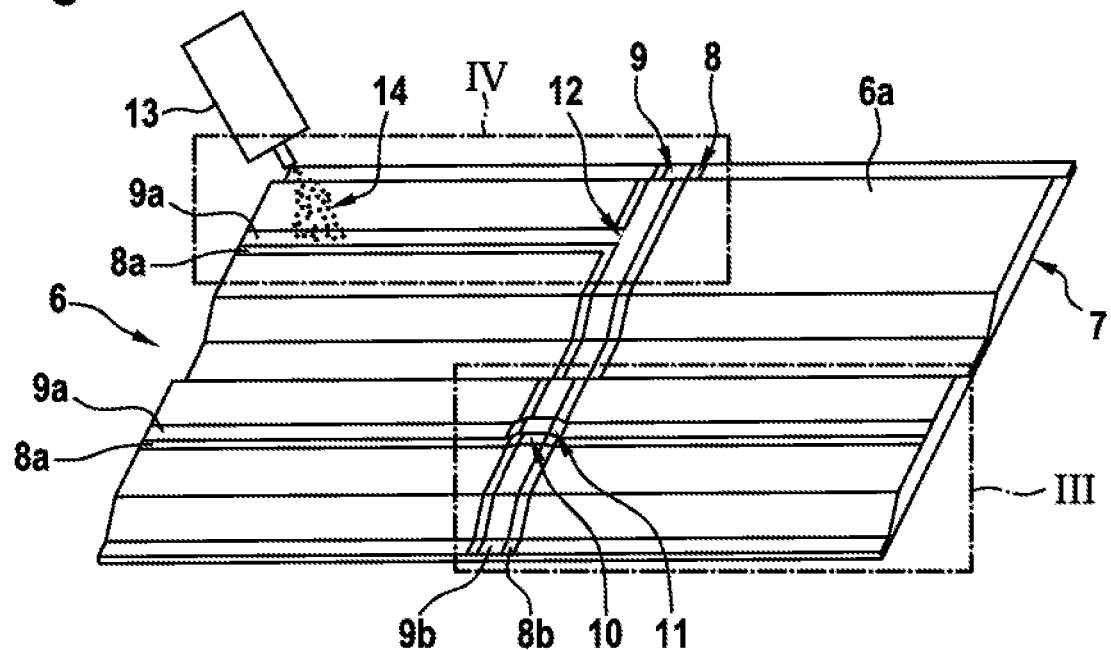
FIG. 2 illustrates a method of manufacturing the structural arrangement of FIG. 1 according to one aspect.

According to one aspect, the fuselage 2 comprises at least one structural arrangement 6, or embodies the structural arrangement 6, which is preferably implemented using at least one fiber reinforced polymer component (7 in FIG. 2). The structural arrangement 6 is exemplarily and representatively described in detail below with respect to FIG. 2 to FIG. 5.

Illustratively, the helicopter 1 further comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, the helicopter 1 further comprises at least one preferentially shrouded counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a vertical stabilizer 5. Illustratively, the tail boom 3 is also provided with a suitable horizontal stabilizer 3a.

Preferably, the tail boom 3 is a composite tail boom, i. e. a tail boom that comprises composite material and that is preferably at least essentially manufactured from composite material, preferentially fiber reinforced polymer material. Illustratively, the composite tail boom 3 is preferably implemented as a slim beam element that comprises at least partly a tail boom cone 3b, which is preferably tubular. In other words, the composite tail boom 3 is preferentially a closed structure with a nearly circular cross section.

FIG. 2 shows the structural arrangement 6 of FIG. 1, which is implemented according to one aspect. More specifically, FIG. 2 illustrates an exemplary method of manufacturing the structural arrangement 6 on the basis of a fiber reinforced polymer component 7.

The at least one fiber reinforced polymer component 7 is preferably implemented as a panel or shell of the helicopter 1 of FIG. 1. More specifically, the at least one fiber reinforced polymer component 7 is preferentially made of non-conductive material 6a and illustratively implemented as a sandwich component. Preferably, the at least one fiber reinforced polymer component 7 is pre-produced by means of a standard procedure in a preliminary process.

The at least one fiber reinforced polymer component 7 preferentially comprises carbon fiber reinforced polymers. However, the at least one fiber reinforced polymer component 7 may alternatively comprise also other kinds of reinforcement fibers, such as glass, aramid and so on. Even more generally, the present invention is not limited to such fiber reinforced polymer components, but likewise applies to any component that comprises non-conductive material, such as the non-conductive material 6a. Thus, in the context of the present invention the term "fiber reinforced polymer component" is construed for designating any component of non-conductive material, comprising components made of fiber reinforced polymers.

According to one aspect, the method of manufacturing the structural arrangement 6 starts with providing the fiber reinforced polymer component 7. Then, one or more intermediate thermoplastic layers 8 are created on the fiber reinforced polymer component 7, at least in one or more regions where one or more electrically conductive layers 9 are to be formed. Preferably, the one or more intermediate thermoplastic layers 8 are created by fixing a polyether sulfone foil on the fiber reinforced polymer component 7.

Illustratively, a polyether sulfone foil 8a is fixed on the fiber reinforced polymer component 7 in a region where an electrically conductive layer 9a is to be formed, and a polyether sulfone foil 8b is fixed on the fiber reinforced polymer component 7 in a region where an electrically conductive layer 9b is to be formed. Preferably, the polyether sulfone foils 8a, 8b are bonded onto the fiber reinforced polymer component 7. By way of example, the polyether sulfone foils 8a, 8b are provided in the form of strips.

For simplicity and clarity of the drawings, each longitudinally arranged polyether sulfone foil strip is labelled with the reference sign "8a" and each transversally arranged polyether sulfone foil strip is labelled with the reference sign "8b". Accordingly, in FIG. 2 two longitudinally arranged polyether sulfone foils 8a and only a single transversally arranged polyether sulfone foil 8b are exemplarily provided.

However, it should be noted that the present invention is not intended to restrict the polyether sulfone foils 8a, 8b to strips. Instead, each one of the polyether sulfone foils 8a, 8b may exhibit a form and dimension that is application-specific. For instance, each one of the polyether sulfone foils 8a, 8b may have the form of a strip or alternatively be implemented as a patch or a large-area surface element, the strip, patch and large-scale surface element being respectively made of polyether sulfone.

Furthermore, it should be noted that at least one and, preferably, each one of the polyether sulfone foils 8a, 8b preferably exhibits a thickness in a range of 50 µm to 100 µm. However, the present invention is not restricted to such a thickness range and other thicknesses are likewise possible. For instance, in an application-specific manner, a thickness of more than 100 µm can alternatively be selected.

According to one aspect, a cold gas spraying process is performed in a subsequent method step for spraying electrically conductive particles 14 onto at least one and, preferably, each one of the polyether sulfone foils 8a, 8b. Thus, at least one and, preferably, each one of the electrically conductive layers 9a, 9b is created on the respective polyether sulfone foil 8a, 8b. Suitable electrically conductive particles 14 are e. g. copper, aluminium, silver, tin and/or alloy particles.

For simplicity and clarity of the drawings, each longitudinally arranged electrically conductive layer is labelled with the reference sign "9a" and each transversally arranged electrically conductive layer is labelled with the reference sign "9b". Accordingly, in FIG. 2 two longitudinally arranged electrically conductive layers 9a and only a single transversally arranged electrically conductive layer 9b are exemplarily provided.

Preferably, spraying of the electrically conductive particles 14 is performed by means of a suitable spraying tool 13, preferentially in an automated process. However, it should be noted that respective spraying tools that can be used to implement the spraying tool 13 are, as such, not part of the present invention and, furthermore, well-known to the person skilled in the art. Therefore, a more detailed description of the spraying tool 13 is omitted for brevity and conciseness.

Nevertheless, it should simply be noted that the present invention is not limited to an automated cold gas spraying process using the spraying tool 13 as described above. Instead, a manual spraying process using a suitable spraying tool is likewise contemplated.

According to one aspect, a vacuum cleaning of the structural arrangement 6 is performed in a final method step after having performed the cold gas spraying process. However, it should be noted that the vacuum cleaning may alternatively or in addition also be performed during the cold gas spraying process. Thus, all electrically conductive particles that do not adhere to one of the polyether sulfone foils 8a, 8b can be evacuated.

By way of example, FIG. 2 also shows a conductive layer bridge 11 and a conductive layers junction 12. The conductive layer bridge 11 is described in more detail below with reference to FIG. 3 and the conductive layers junction 12 is described in more detail below with reference to FIG. 4.

Figure 3:
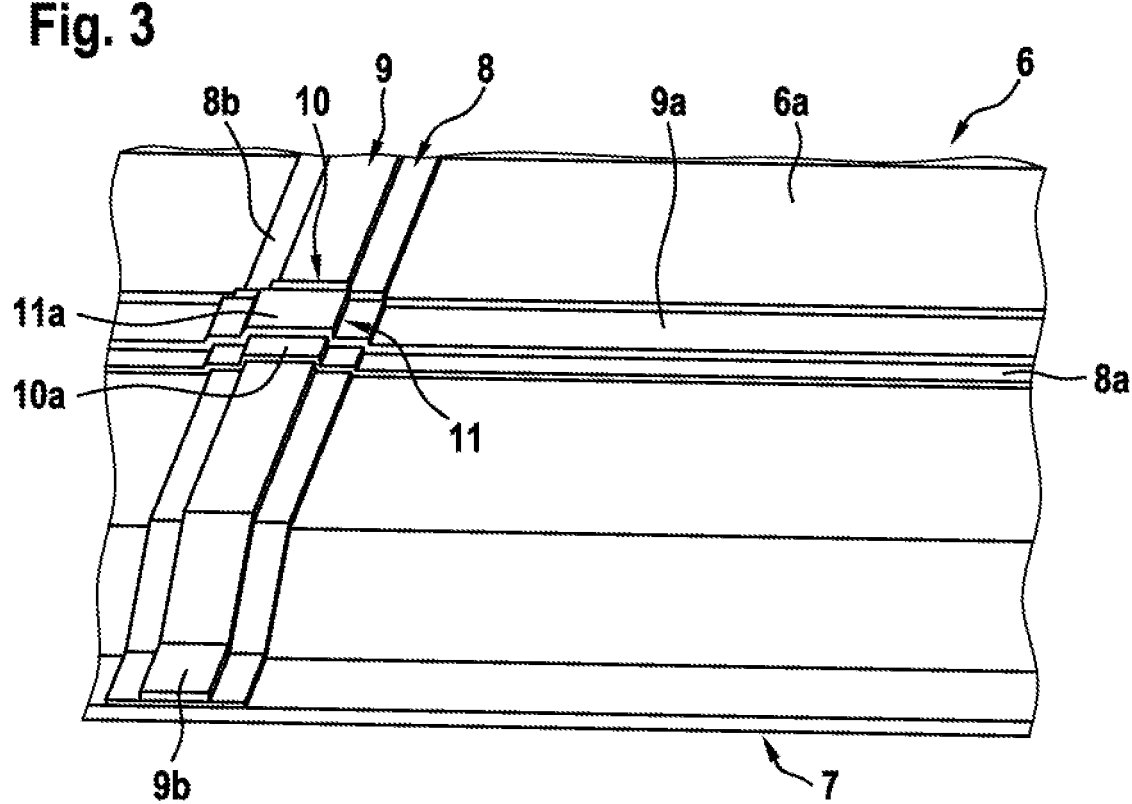
FIG. 3 shows a perspective view of an enlarged detail III of the structural arrangement of FIG. 2.

FIG. 3 shows the structural arrangement 6 of FIG. 2 by way of example after manufacturing. Illustratively, the structural arrangement 6 comprises the at least one fiber reinforced polymer component 7, the cold gas sprayed electrically conductive layers 9a, 9b, and the polyether sulfone foils 8a, 8b that are arranged on the fiber reinforced polymer component 7 in the regions between the fiber reinforced polymer component 7 and the cold gas sprayed electrically conductive layers 9a, 9b.

As described above with reference to FIG. 2, the polyether sulfone foils 8a, 8b, which are illustratively formed as strips and/or patches made of polyether sulfone, are preferably bonded onto the fiber reinforced polymer component 7 and preferentially exhibit a thickness in a range of 50 µm to 100 µm. Furthermore, as also described above with reference to FIG. 2, the cold gas sprayed electrically conductive layers 9a, 9b preferably comprise copper, aluminium, silver, tin and/or alloy particles.

Illustratively, the cold gas sprayed electrically conductive layer 9a bridges the cold gas sprayed electrically conductive layer 9b, by way of example in the region of the conductive layer bridge 11 of FIG. 2. It should be noted that the cold gas sprayed electrically conductive layer 9a of FIG. 3 corresponds to the lower one of the two cold gas sprayed electrically conductive layers 9a of FIG. 2.

According to one aspect, the conductive layer bridge 11 is equipped with an intermediate thermoplastic separator 10 that isolates the cold gas sprayed electrically conductive layer 9a from the cold gas sprayed electrically conductive layer 9b to avoid an undesired short circuit between both. The intermediate thermoplastic separator 10 is preferably bonded and/or welded to the polyether sulfone foil 8b in the region of the conductive layer bridge 11. Preferentially, the intermediate thermoplastic separator 10 comprises at least one polyether sulfone separator 10a.

More specifically, the intermediate thermoplastic separator 10 resp. the at least one polyether sulfone separator 10a is preferably bonded and/or welded to the polyether sulfone foil 8b after having created the cold gas sprayed electrically conductive layer 9a as described above with reference to FIG. 2, and prior to creating the cold gas sprayed electrically conductive layer 9b as described above with reference to FIG. 2. The cold gas sprayed electrically conductive layer 9a can then be created as described above with reference to FIG. 2 such that a cold gas sprayed metal layer bridge 11a is created on the intermediate thermoplastic separator 10 resp. the at least one polyether sulfone separator 10a.

Figure 4:
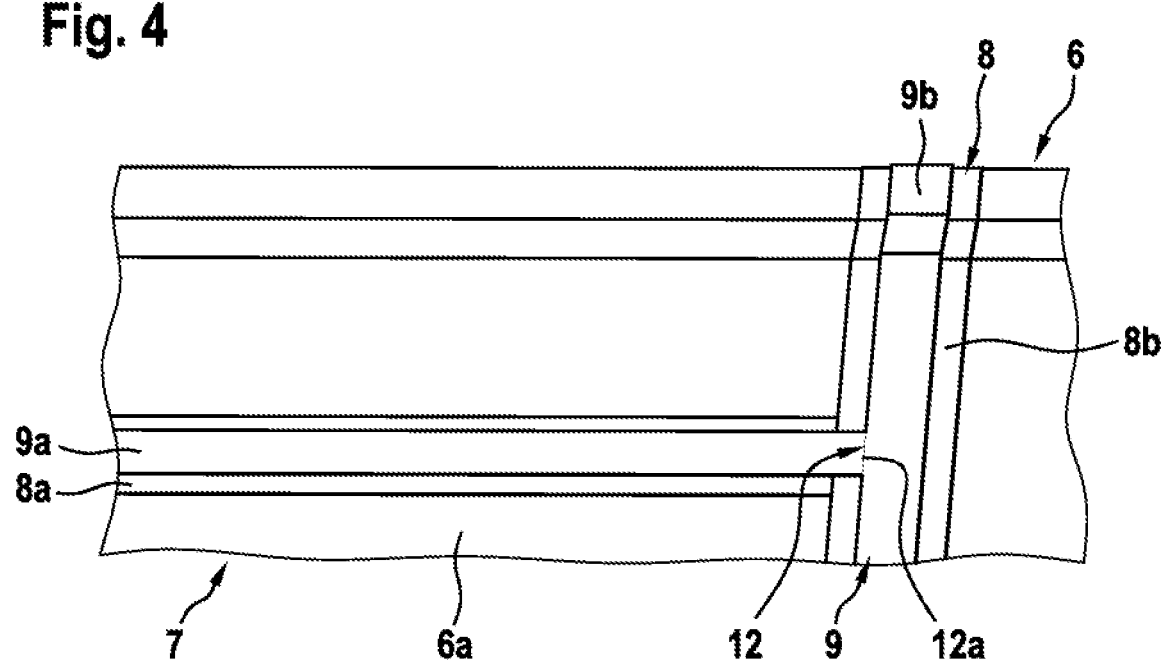
FIG. 4 shows a perspective view of an enlarged detail IV of the structural arrangement of FIG. 2.

FIG. 4 shows the structural arrangement 6 of FIG. 2 by way of example after manufacturing. Illustratively, the structural arrangement 6 comprises the at least one fiber reinforced polymer component 7, the cold gas sprayed electrically conductive layers 9a, 9b, and the polyether sulfone foils 8a, 8b that are arranged on the fiber reinforced polymer component 7 in the regions between the fiber reinforced polymer component 7 and the cold gas sprayed electrically conductive layers 9a, 9b.

As described above with reference to FIG. 2, the polyether sulfone foils 8a, 8b, which are illustratively formed as strips and/or patches made of polyether sulfone, are preferably bonded onto the fiber reinforced polymer component 7 and preferentially exhibit a thickness in a range of 50 µm to 100 µm. Furthermore, as also described above with reference to FIG. 2, the cold gas sprayed electrically conductive layers 9a, 9b preferably comprise copper, aluminium, silver, tin and/or alloy particles.

Illustratively, the cold gas sprayed electrically conductive layer 9a is connected to the cold gas sprayed electrically conductive layer 9b, by way of example at the conductive layers junction 12 of FIG. 2. It should be noted that the cold gas sprayed electrically conductive layer 9a of FIG. 4 corresponds to the upper one of the two cold gas sprayed electrically conductive layers 9a of FIG. 2.

More specifically, according to one aspect a cold gas sprayed metal layer junction 12a electrically connects the cold gas sprayed electrically conductive layer 9a to the cold gas sprayed electrically conductive layer 9b at the conductive layers junction 12. Preferably, the polyether sulfone foils 8a, 8b are also connected at the conductive layers junction 12.

Figure 5:
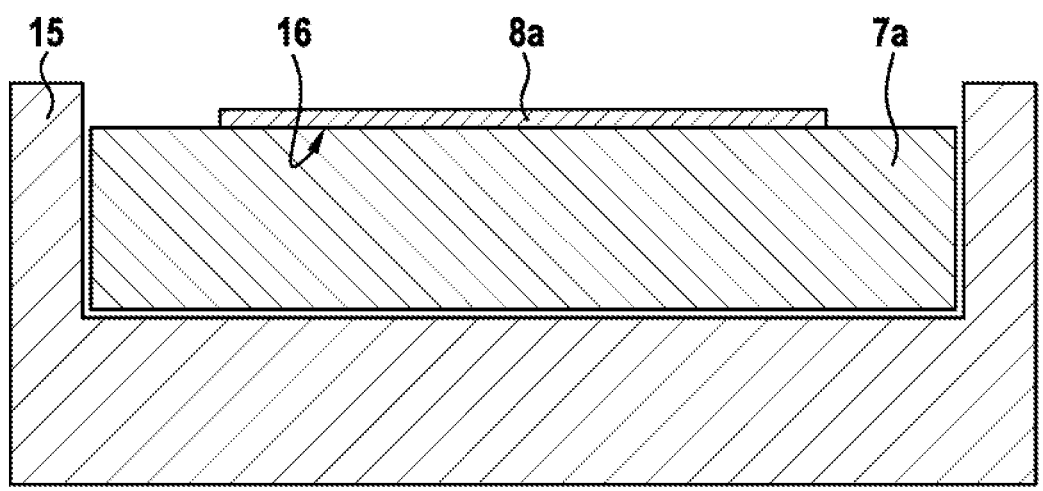
FIG. 5 illustrates a method of manufacturing the structural arrangement of FIG. 1 according to another aspect.

FIG. 5 illustrates an alternative method of manufacturing the structural arrangement 6 of FIG. 1, which is slightly modified with respect to the method described above with reference to FIG. 2. More specifically, instead of using according to FIG. 2 the at least one fiber reinforced polymer component 7 that is preferably pre-produced by means of a standard procedure in a preliminary process, now a thermoset fiber reinforced polymer preform 7a is used.

According to one aspect, a mold 15 is provided and the thermoset fiber reinforced polymer preform 7a, which is preferably impregnated with epoxy resin 16, is arranged in the mold 15. Then, a polyether sulfone foil, which is embodied and formed as described above with reference to FIG. 2, is positioned on top of, resp. above, the thermoset fiber reinforced polymer preform 7a in the mold 15. By way of example and for simplicity and clarity of the drawings, only the polyether sulfone foil 8a of FIG. 2 is positioned on top of, resp. above, the thermoset fiber reinforced polymer preform 7a.

However, it should be noted that positioning of the polyether sulfone foil on top of, resp. above, the thermoset fiber reinforced polymer preform 7a in the mold 15 is merely described by way of example, and not for limiting the invention accordingly. Instead, the polyether sulfone foil may likewise be positioned on the bottom of, resp. below, the thermoset fiber reinforced polymer preform 7a in the mold 15, or respective polyether sulfone foils may be positioned above and below the thermoset fiber reinforced polymer preform 7a in the mold 15.

According to one aspect, the polyether sulfone foil 8a is then cured together with the thermoset fiber reinforced polymer preform 7a for fixing the polyether sulfone foil 8a on the fiber reinforced polymer component 7. More specifically, the polyether sulfone foil 8a and the thermoset fiber reinforced polymer preform 7a are preferably cured together such that the polyether sulfone foil 8a merges with the epoxy resin 16 of the thermoset fiber reinforced polymer preform 7a.

Thus, by curing the thermoset fiber reinforced polymer preform 7a, the fiber reinforced polymer component 7 of FIG. 2 is obtained. However, by curing the polyether sulfone foil 8a together with the thermoset fiber reinforced polymer preform 7a, the polyether sulfone foil 8a becomes an integrally formed part of the fiber reinforced polymer component 7 of FIG. 2, as it is merged with the epoxy resin 16 thereof. Thus, bonding of the polyether sulfone foil 8a to the fiber reinforced polymer component 7 of FIG. 2 as described above with reference to FIG. 2 can advantageously be omitted.

It should be noted that modifications to the above described embodiments are within the common knowledge of the person skilled in the art and, thus, also considered as being part of the present invention. For instance, while the present invention is described above with reference to a structural arrangement for the helicopter 1 of FIG. 1, the inventive method can more generally be applied to any similar structural arrangement independent of a respective use thereof. In other words, the structural arrangement that is manufactured according to the present invention cannot only be used with helicopters, but instead with any aircraft and, furthermore, also with other vessels or even independent of a predetermined use with such a vessel or aircraft.

Furthermore, it should be noted that the electrically conductive layers that are created according to the present invention on an associated fiber reinforced polymer component are advantageously usable as a suitable protection of the structural arrangement that is manufactured according to the present invention and, more particularly, of the associated respective fiber reinforced polymer component against LDEs and LIEs, as already described above. However, the present invention is not limited to such LDE and LIE protection. Instead, the electrically conductive layers can likewise be used for other purposes, such as e. g. electrical power supply and/or as data lines.

REFERENCE LIST 1 rotary wing aircraft
1a multi-blade main rotor
1b, 1c rotor blades
1d rotor head
1e rotor shaft
1f landing gear
2 fuselage
2a cabin
2b rear fuselage
3 tail boom
3a horizontal stabilizer
3b tail boom cone
4 counter-torque device
4a tail rotor
5 vertical stabilizer
6 structural arrangement
6a non-conductive material
7 fiber reinforced polymer component
7a thermoset fiber reinforced polymer preform
8 intermediate thermoplastic layers
8a longitudinal polyether sulfone foil
8b transversal polyether sulfone foil
9 electrically conductive layers
9a longitudinal cold gas sprayed metal layers
9b transversal cold gas sprayed metal layers
10 intermediate thermoplastic separator
10a polyether sulfone separator
11 conductive layer bridge
11a cold gas sprayed metal layer bridge
12 conductive layers junction
12a cold gas sprayed metal layer junction
13 spraying tool
14 electrically conductive particles
15 mold
16 epoxy resin

What is claimed is:

1. A method of manufacturing a structural arrangement from a fiber reinforced polymer component, comprising the steps of:
    providing a fiber reinforced polymer component;
    fixing a polyether sulfone foil on the fiber reinforced polymer component, at least in a region where an electrically conductive layer is to be formed; and
    performing a cold gas spraying process for spraying electrically conductive particles onto the polyether sulfone foil in order to create the electrically conductive layer.

2. The method of claim 1,
wherein the step of fixing the polyether sulfone foil on the fiber reinforced polymer component comprises bonding the polyether sulfone foil onto the fiber reinforced polymer component.

3. The method of claim 1,
wherein the step of providing the fiber reinforced polymer component comprises providing a thermoset fiber reinforced polymer preform, and wherein the step of fixing the polyether sulfone foil on the fiber reinforced polymer component comprises curing the polyether sulfone foil together with the thermoset fiber reinforced polymer preform.

4. The method of claim 3,
wherein curing the polyether sulfone foil together with the thermoset fiber reinforced polymer preform comprises curing the polyether sulfone foil together with the thermoset fiber reinforced polymer preform such that the polyether sulfone foil merges with epoxy resin of the thermoset fiber reinforced polymer preform.

5. The method of claim 1,
wherein the step of fixing a polyether sulfone foil on the fiber reinforced polymer component comprises fixing at least one strip and/or patch made of polyether sulfone at least in the region where the electrically conductive layer is to be formed.

6. The method of claim 1,
wherein the step of fixing a polyether sulfone foil on the fiber reinforced polymer component comprises fixing a polyether sulfone foil with a thickness in a range of 50 µm to 100 µm on the fiber reinforced polymer component.

7. The method of claim 1,
wherein spraying electrically conductive particles onto the polyether sulfone foil comprises spraying copper, aluminium, silver, tin and/or alloy particles onto the polyether sulfone foil.

8. The method of claim 1,
further comprising vacuum cleaning the polyether sulfone foil after or during the step of performing the cold gas spraying process.

9. A method of manufacturing a structural arrangement, the method comprising:
providing a fiber reinforced polymer component;
fixing a polyether sulfone foil on the fiber reinforced polymer component; and
cold gas spraying electrically conductive particles onto the polyether sulfone foil to create an electrically conductive layer, wherein the polyether sulfone foil is disposed on the fiber reinforced polymer component between the fiber reinforced polymer component and the electrically conductive layer.

10. The method of claim 9,
wherein fixing the polyether sulfone foil on the fiber reinforced polymer component comprises bonding the polyether sulfone foil onto the fiber reinforced polymer component.

11. The method of claim 9,
wherein providing the fiber reinforced polymer component comprises providing a thermoset fiber reinforced polymer preform, and wherein fixing the polyether sulfone foil on the fiber reinforced polymer component comprises curing the polyether sulfone foil together with the thermoset fiber reinforced polymer preform.

12. The method of claim 11,
wherein curing the polyether sulfone foil together with the thermoset fiber reinforced polymer preform comprises curing the polyether sulfone foil together with the thermoset fiber reinforced polymer preform such that the polyether sulfone foil merges with epoxy resin of the thermoset fiber reinforced polymer preform.

13. The method of claim 9,
wherein fixing the polyether sulfone foil on the fiber reinforced polymer component comprises fixing at least one strip and/or patch made of polyether sulfone in a region where the electrically conductive layer is to be formed.

14. The method of claim 9,
wherein the polyether sulfone foil has a thickness of 50 µm to 100 µm.

15. The method of claim 9,
wherein the electrically conductive particles comprises particles of copper, aluminium, silver, tin and/or alloy particles.

16. The method of claim 9,
further comprising vacuum cleaning a portion of the electrically conductive particles after or during the step the cold gas spraying process.

17. A method of manufacturing a structural arrangement, the method comprising:
providing a fiber reinforced polymer component;
fixing a polyether sulfone foil on the fiber reinforced polymer component, wherein the polyether sulfone foil has a thickness in a range of 50 µm to 100 µm; and
cold gas spraying electrically conductive particles onto the polyether sulfone foil to create an electrically conductive layer.

18. The method of claim 17,
wherein fixing the polyether sulfone foil on the fiber reinforced polymer component comprises bonding the polyether sulfone foil onto the fiber reinforced polymer component.

19. The method of claim 17,
wherein providing the fiber reinforced polymer component comprises providing a thermoset fiber reinforced polymer preform, wherein fixing the polyether sulfone foil on the fiber reinforced polymer component comprises curing the polyether sulfone foil together with the thermoset fiber reinforced polymer preform, and wherein curing the polyether sulfone foil together with the thermoset fiber reinforced polymer preform comprises curing the polyether sulfone foil together with the thermoset fiber reinforced polymer preform such that the polyether sulfone foil merges with epoxy resin of the thermoset fiber reinforced polymer preform.

* * * * *